April 2, 1957 W. W. PHARIS 2,787,663

CONFERENCE CIRCUIT

Filed April 5, 1954 3 Sheets-Sheet 1

INVENTOR
WILLIAM W. PHARIS
BY
Francis S Blake
ATTORNEY

April 2, 1957 W. W. PHARIS 2,787,663

CONFERENCE CIRCUIT

Filed April 5, 1954 3 Sheets-Sheet 2

INVENTOR
WILLIAM W. PHARIS
BY
Francis E. Blake
ATTORNEY

INVENTOR
WILLIAM W. PHARIS
BY
Francis I. Blake
ATTORNEY

United States Patent Office 2,787,663
Patented Apr. 2, 1957

2,787,663

CONFERENCE CIRCUIT

William W. Pharis, Rochester, N. Y., assignor, by mesne assignments, to General Dynamics Corporation, a corporation of Delaware Application April 5, 1954, Serial No. 420,780
6 Claims. (Cl. 179—18)

This invention relates to telecommunication systems and particularly to means in a telephone system for establishing a conference connection.

The object of the invention is to provide means for simultaneously summoning a preselected plurality of subscribers whose stations are either idle or busy and to render such stations immediately connectible to a common or conference circuit.

In accordance with the present invention a conference circuit with which a preselected number of stations are permanently associated may be triggered for a predetermined period of time and a signal transmitted to each of said stations. During this period any idle station which responds is immediately connected to the conference circuit without any other act on the part of the subscriber thereat than the ordinary act of answering a call. Also during this period any busy station which abandons a connection in which it may be engaged and then answers the call signal in the ordinary manner will be immediately connected to the conference circuit.

A subscriber on a conference circuit line involved in another call when the conference call is initiated will be given a predetermined time to abandon such call and prepare to join the conference. If the fails to abandon such call within the said time limit, then such previously established connection will be unceremoniously disrupted and his line will be connected to the conference circuit.

A feature of the invention is a conference circuit network having a preselected plurality of stations permanently associated therewith and having means responsive to the approach thereto by a particular one of said stations for triggering said circuit network into an active condition for a predetermined period. Any one of said stations at which the telephone is lifted during this period will perfect the conference circuit and will cause the bells at all other idle stations to be rung. If no one of the stations is busy, then the normal procedure is for the particular party making the conference call to trigger the circuit, hang up, and then again lift his telephone. The bells on the other lines do not start to ring until such party has again lifted his telephone. In the unlikely event that some other conference circuit line lifts its telephone after the calling party has triggered the circuit and then retired, but before he comes back on the line, the conference circuit will nevertheless be perfected or enabled and the call bells of the other lines will be rung. In the event that one or more conference lines are busy in other calls when the conference circuit is triggered, a conference call tone signal will be transmitted to each as soon as the calling party has approached the conference circuit and then hung up. If in this period and before the calling party has again lifted his telephone, one of such busy lines should abandon its call and then respond, such response would perfect the conference call and enable the conference circuit so that the bells at all idle stations would commence to ring.

If, after the conference circuit has been triggered and no conference line station responds within a predetermined time, then the circuit times out and any and all of the substations associated therewith may operate conventionally.

Another feature of the invention is a means for delaying the application of ringing current for a short period to prevent the false signal which might otherwise be transmitted by a certain fortuitous operation of the conference call circuit. There may be a circuit condition set up in which the conference circuit is triggered for a fleeting instant which does not actually represent an attempt to set up a conference call, so that by this provision the ringing of the bells of the conference call lines is prevented.

Within the conference call circuit, means is provided to operate and lock in a relay for each idle station during the trigger period. If during this period any one or more of the stations respond, then this locking circuit will be maintained until the conference has been terminated and every station has retired.

Within the conference call circuit another means is provided to operate and lock in a relay for each station which responds so that the bell at such station will cease to ring. Thereafter, if the party retires from the conference before it is over his bell will not ring again, but his line will still be connected to the conference circuit so that, should he lift his telephone before the conference is over, he will again be added thereto.

A feature of the invention is a circuit arrangement whereby every subscriber whose station is associated with the conference circuit will be held exclusively to the conference arrangement until the last party in the conference has withdrawn. There is no exception to this for even if a subscriber attempts to ignore the summons when he is already engaged in a conversation, his line will be forcibly disconnected from such other circuit and added to the conference call circuit.

A feature of the invention is an arrangement whereby no unauthorized person may start a conference call. While it may be possible for such an unauthorized person to establish a connection to the conference call terminals and thus trigger the circuit, he has no means for perfecting or enabling the circuit and thus start the ringing. This feature may thus be stated as means responsive to a series of operations for starting a conference call effective only from a station of a line permanently associated with the conference circuit.

Another feature of the invention is a double interval timing arrangement. The conference circuit may be triggered by any calling station which may then retire. Thereupon time is counted and if, after a certain number of intervals has been counted, no station has acted to perfect or enable the conference circuit, it will time out, that is, it will be automatically released. If, however, during this initial number of time intervals, some one station permanently associated with the circuit acts to enable the circuit, then a certain number of additional time intervals will be counted, at the termination of which any station still busy in a pre-established connection will be forcibly disconnected from such pre-established connection and connected to the conference call circuit.

Other features will appear hereinafter.

The drawings consist of three sheets having five figures, as follows.

Figure 2:
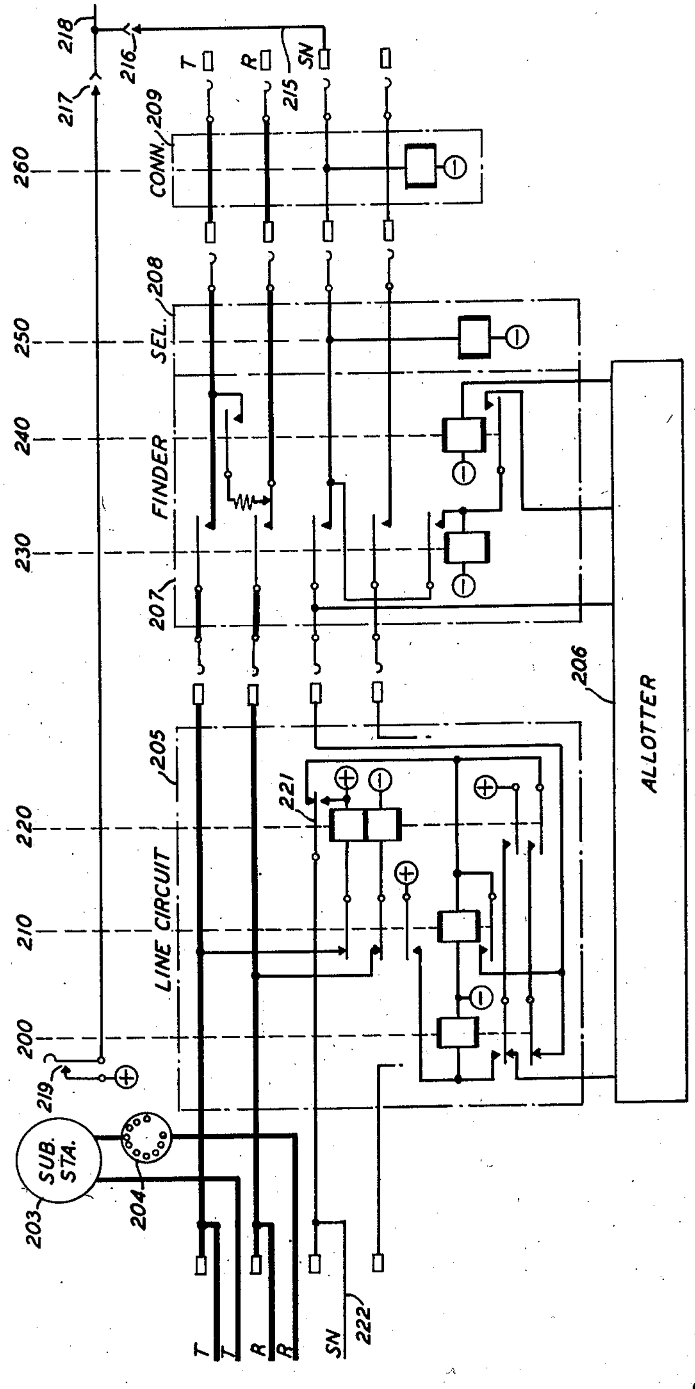
Fig. 2 is a circuit diagram of a substation arrangement with its conventional line circuit, a conventional finder, selector and connector, by which a connection may be extended to any given set of connector terminals.
Figure 1:
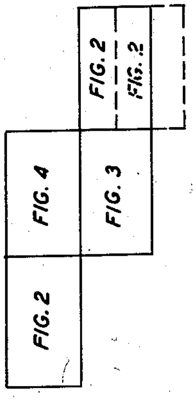
Fig. 1 is a block diagram showing how Figs. 2, 3 and 4 may be placed to constitute a complete circuit diagram of the arrangement of the present invention.
Figure 3:
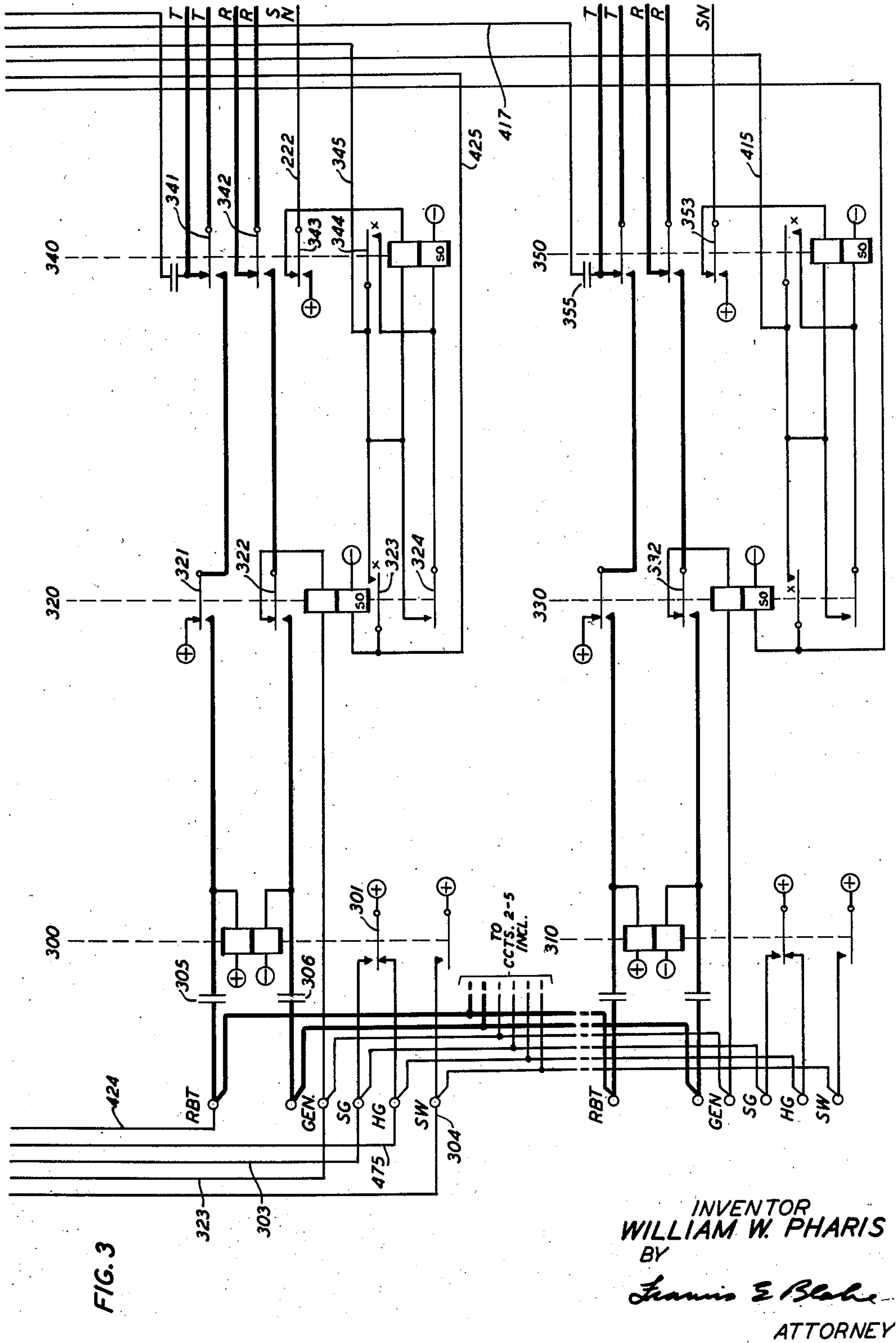
Fig. 3 is a circuit diagram showing in detail the circuit for two of six stations permanently associated with the conference circuit and indicating the remainder.
Figure 4:
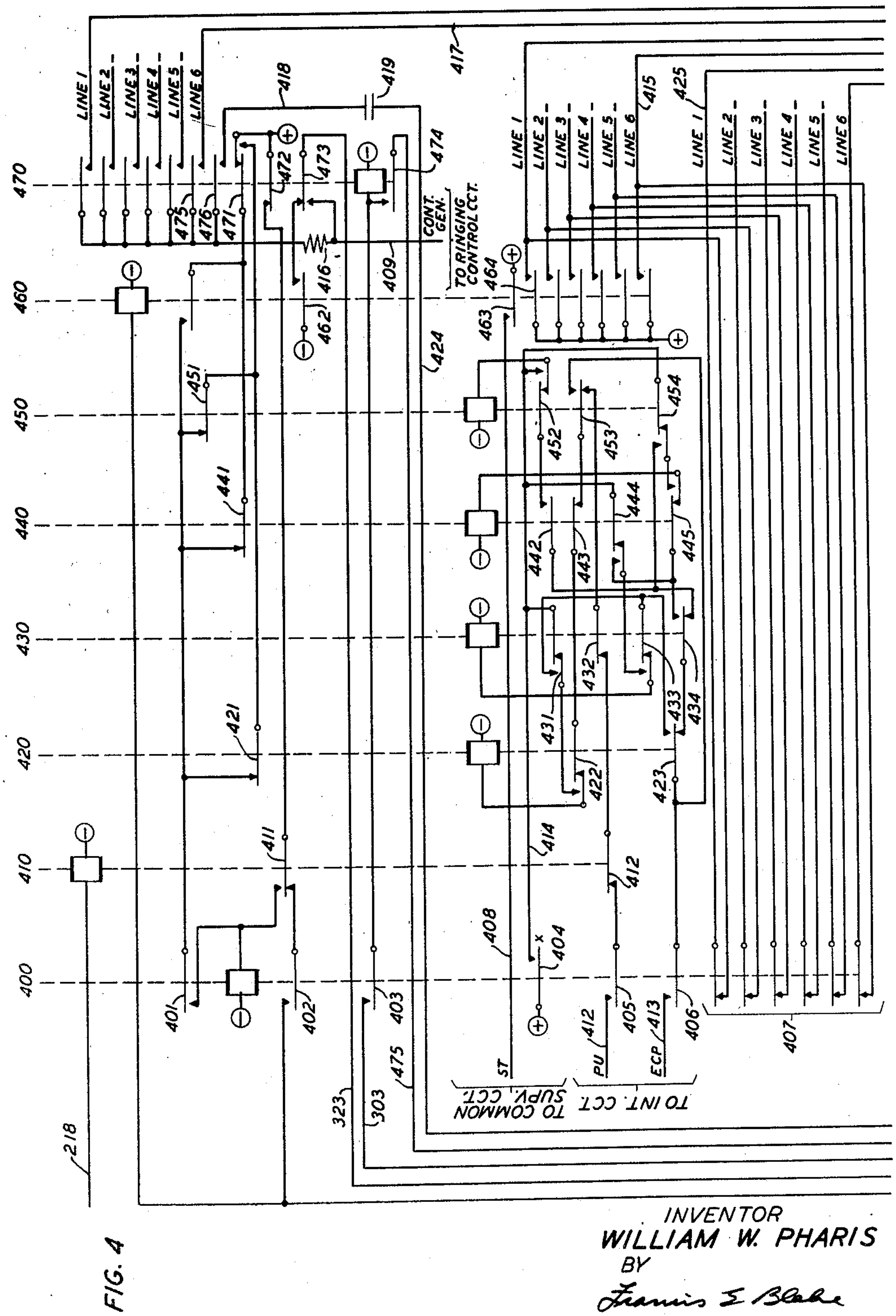
Fig. 4 is a circuit arrangement of the control for this conference circuit.

It will be noted from Fig. 1 that Fig. 2 may be placed to the left to indicate how a connection may be established to the connector bank terminals of the number assigned to the conference circuit, or, alternatively, how a key at a designated station may be operated to trigger the circuit. Fig. 2 may also be placed variously at the right of Fig. 3 to show how the various substations may be connected into the conference circuit. It will be particularly noted that the substation 203 is extended by its tip and ring conductors to the armatures 341 and 342 of the relay 340 and through the back contacts of these armatures to the conventional tip and ring conductors leading into the line circuit 205. Therefore, it will appear that each substation normally is connected to its own line circuit and may in conventional manner operate this line circuit to in turn enable the allotter 206 to start the finder 207 so that the line will be picked up by the finder and extended to a selector 208. By means of the dial 204 the subscriber may operate the selector 208 and thus extend the connection to the connector 209. By the further operation of the dial 204 the connector will then extend the line to the terminals assigned to the conference circuit, whereupon the sleeve conductor 215 will be grounded in conventional manner and if the connection 216 is made the conductor 218 will be grounded. Alternatively, a key 219 may be provided at the substation so that by the alternative connection 217 the conductor 218 may thereby be grounded.

The conference circuit is triggered either by having the substation 203 extend a connection to the connector terminals assigned for conference circuit and thus through the sleeve conductor 215 placing a ground on conductor 218, or, as explained, through the momentary operation of the key 219. The ground is supplied only momentarily for, either through the momentary operation of the key 219, or the momentary connection of the connector to the terminals, the relay 410 will be operated. As shown in the time chart, Fig. 5, the duration of the operation of relay 410 is only momentary. During this period a connection will be extended from ground, armature 472 and its back contact, armature 411 and its front contact, the winding of relay 400 to battery. Relay 400 immediately operates and locks through its front contact and armature 401, the back contact and armature 441, the normal contacts of armature 471 to ground. Upon the release of relay 410 a connection is extended from ground, armature 472 and its back contact, armature 411 and its back contact, armature 402 and its front contact, and thence through the winding of relay 460 to battery.

Upon the operation of relay 460 ground will be extended through armature 463 and its front contact to the start wire 408 so that the common apparatus in the supervisory circuit will be started into operation. This will cause the constant generator connected to conductor 409 to operate and will start the interrupter which will supply pulses on the PU lead 412 and the ECP lead 413. Upon the first PU pulse following this a circuit will be established through the front contact and armature 405, the back contact and armature 412, the back contact and armature 432, the back contact and armature 453, the back contact and armature 443, the back contact and armature 422, and thence through the winding of the first counting relay 420 resulting in the operation of this relay. This relay immediately locks in a circuit from its winding through the alternate contacts of its armature 422, the normal contacts of armature 431, the common conductor 414, through the front contact and armature 404 to ground. Following this and upon the first ECP pulse over conductor 413 thereafter, ground will be extended through the front contact and armature 406, armature 423 and its front contact, armature 433 and its normal contact, through the winding of the second counting relay 430 to battery. This results in the operation of relay 430. During the remainder of this pulse the connection from ground on conductor 413 over the front contact and armature 406 will be extended over armature 423 and its front contact, the alternate contacts of armature 431, the alternate contacts of armature 422 to the winding of the first counting relay 420, but upon the end of this ECP pulse the first counting relay 420 will be released.

Six seconds later when the next ECP pulse is supplied to conductor 413, a circuit will be extended through the front contact and armature 406, the armature 423 and its back contact, the armature 434 and its front contact, the armature 445 and its back contact, through the winding of the third counting relay 440. This causes the connection for the locking circuit of the relay 400 to be opened at armature 441 so that if up to this time the subscriber at station 203 has not taken his telephone from its cradle and thus operated one of the relays 300 or 310, the relay 400 will be released so that the circuit will thus time out and become released.

Figure 5:
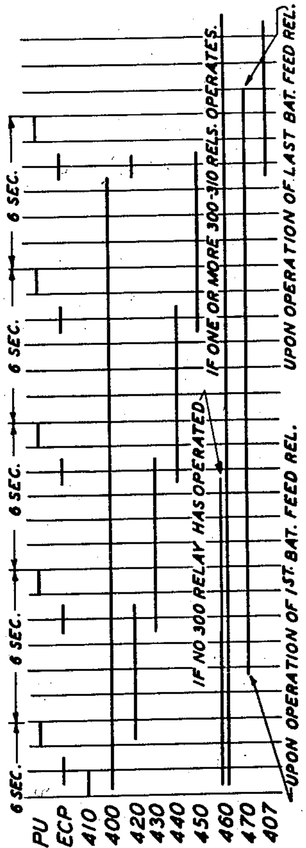
Fig. 5 is a time chart showing the sequence of operations and particularly the operations of the counting relays.

If, on the other hand and as indicated in the time chart of Fig. 5, the subscriber at station 203, or any other subscriber associated with this conference circuit, has removed his telephone from its cradle so as to operate a relay 300 or a relay 310, then the conference circuit will be enabled. This may be followed, by way of example, by the following operations. The subscriber, in removing his telephone from its cradle, will operate his conventional line circuit so that the line relay 220 will operate and through its armature 221 and front contact will extend a ground to the sleeve conductor 222, thence through the armature 343, the upper winding of the relay 340, the conductor 345, front contact and armature 464 to ground. This will cause the operation of relay 340 which then locks through its armature 344 to this same ground. At the same time the sleeve conductor 222 will be grounded through the armature 343 and its front contact and the subscriber's line will be switched to the armatures 321 and 322. Immediately, therefore, a circuit will be extended from ground through the back contact and armature 321, the front contact and armature 341, the subscriber station 203, the armature 342 and its front contact, the armature 322 and its back contact, the upper winding of the relay 320, the conductor 323, the armature 473 and its back contact, the armature 462 and its front contact to battery. Therefore, the ring trip relay 320 will immediately operate and further extend the subscriber line to the two windings of the battery feed relay 300. This relay operates and through its armature 301 places a ground on conductor 303 which is then extended through the front contact and armature 403 to the winding of the relay 470. The relay 470 operates and locks through its armature 474 to conductor 475 which, it will be noted, is multipled to the back contact of armature 301 of relay 300 and the back contact of similar armatures on all the other battery feed relays. Since it is assumed that only this one subscriber has answered and by causing the operation of the relay 470 has enabled the circuit, then a ground will be found on conductor 475 from back contacts of all other battery feed relays associated with the other lines of this conference.

Upon the operation of relay 470 the battery supplied through armature 462 to the back contact of armature 473 is changed to ringing current supplied over the conductor 409 so that ringing current will now be transmitted over the back contact and armature 332 and similar circuits to each of the remaining substations which have not as yet answered.

It may be noted that upon the operation of the relay 460 a ground was extended over a conductor similar to conductor 345 for each of the lines associated with the conference circuit. In the case of conductor 415 this ground will be extended through the upper winding of relay 340, through the back contact and armature 353 to the sleeve conductor leading into the line circuit of the associated substation, thence through an armature, such as 221 and its back contact and the winding of the cut off relay 210, to battery. Through the slow operating characteristics of the relay 350 the operation of relay 350 will be slightly delayed, but in a short time this relay will operate. Thereupon the ringing current supplied through the upper winding of the relay 330 will be transmitted to the called substation and this station will thereby be summoned.

Where a substation is actually engaged in a conversation, the sleeve lead will be grounded and hence the ground extended over conductor 415 and through the upper winding of the relay 350 will be ineffective so that this substation will be left in its established connection temporarily. During this time the generator current on conductor 409 will be extended through a resistor 416 through the armature 475 and its front contact, conductor 417, through a condenser 355, into the tip conductor of the busy line. Therefore, the busy subscriber will be notified by a tone that he is being summoned.

It may also be noted that during this period ringing current through resistor 416 will be extended by armature 476 to conductor 418 through condenser 419 and thence over conductor 424 to the tip conductor of all the substations associated with this conference circuit. Since the relay 470 will remain operated until the last of these substations has answered, this ring back tone will be transmitted to all of the substations which have answered to notify them that the conference circuit has not been completed as yet by the answer of all the substations assigned thereto.

It may now be noted that in time another ECP pulse will be transmitted over conductor 413, thence through the armature 423 and its back contact, the armature 434 and its back contact, the armature 442 and its front contact, the armature 452 and its normal contact to the winding of the last counting relay 450. Upon the termination of this ECP pulse the third counting relay 440 will release. Thereafter, upon the occurrence of the next ECP pulse, a circuit will be extended from conductor 413, the front contact and armature 406, the front contact and armature 453, the back contact and armature 443, the armature 422 and its back contact, to the winding of the first counting relay 420. Upon the operation of this relay the holding circuit for the relay 400 will be opened at armature 421 and since this holding circuit had previously been opened at the armature 451, the relay 400 will release. Upon the release of this relay 400 the six sets of contacts here designated 407 will be closed and the ground extended by the armatures, such as 464, will now be further extended over a conductor, such as 425. Assuming for the moment that the substation associated with the conductor 425 is busy in another conversation and has refused to heed the warning signal extended to his station. As hereinbefore described, the ground on conductor 425 will be extended through the lower winding of the relay 320 and at the same time through the armature 323 and its front contact, the front contact and armature 324 and the lower winding of the relay 340 so that these two relays 320 and 340 are immediately energized. Therefore, the substation associated with this branch of the conference circuit is immediately and unceremoniously added to the conference circuit and the connection in which this substation was involved is disrupted.

As hereinbefore indicated, as soon as all of the substations have answered and all of the battery feed relays, such as the relay 300 and the relay 310, have operated, the ground will be removed from the conductor 475 and the locking circuit for relay 470 will be opened. Therefore, relay 470 will release and disconnect the source of ringing current on conductor 409 from the various lines leading to the substation circuits. Upon the operation of any one of the battery feed relays, such as relay 300, a ground will be extended to the common conductor 304 to maintain the relay 460 operated until the conference is over and each of the battery feed relays has released.

It will be noted that through the common connections and the condensers, such as 305 and 306, conversation between the different parties to the conference may be carried out.

When the conference is over and the last battery feed relay, such as 300, has released, then ground will be removed from conductor 304 and the relay 460 will release, thus removing the holding grounds to the various groups of relays, such as the relays 320 and 340. The circuit thus returns to normal.

What is claimed is:

1. In a telecommunication system, a conference circuit, a predetermined plurality of station lines permanently associated with said circuit, means to trigger said circuit for a predetermined time interval, means effective during said predetermined time for initiating the transmission of a calling signal to each idle one of said lines and a warning signal to each busy one of said plurality of lines, said last means being operable only by one of said lines, means responsive to each of said lines thereafter for holding said circuit in operative condition until all of said stations have released and means operative at the end of said time interval, provided said means for initiating the transmission of a calling signal has not been operated for releasing said triggered condition.

2. In a telecommunication system, a conference circuit, a predetermined plurality of station lines permanently associated with said circuit, means including a set of line terminals accessible to lines including said predetermined plurality of station lines to trigger said circuit, means to count time controlled by said triggering means and means responsive to said time counting means for releasing said triggered circuit after a predetermined time, means accessible only to said predetermined plurality of lines for enabling said circuit, and means responsive to the last one of said predetermined plurality of lines to retire after use of said circuit for releasing said circuit.

3. In a telecommunication system, a conference circuit, a predetermined plurality of station lines permanently associated with said circuit, means to trigger said circuit for a predetermined time interval, means effective during said predetermined time for enabling said circuit, means operating during said predetermined time interval and after said circuit has been enabled for transmitting a warning signal to each busy one of said plurality of lines and a call signal to each idle one of said lines, and means operative at the end of said predetermined time interval for disconnecting all said busy lines from connections in which they may be involved and for forcibly connecting them to said conference circuit.

4. In a telecommunication system, a conference circuit, a predetermined plurality of station lines permanently associated with said circuit, means to trigger said circuit, means for counting a plurality of time intervals, means operative within a first plurality of said time intervals counted, for enabling said circuit, means responsive to said enablement of said circuit for signalling all of said stations, said means including means for transmitting a tone signal to each busy one and a calling signal to each idle one of said lines, means for releasing said triggered circuit at the end of said first plurality of time intervals counted, responsive to non-enablement of said circuit and means operative at the termination of a second plurality of said time intervals counted, for connecting all busy lines to said circuit.

5. In a telecommunication system, a conference circuit, a predetermined plurality of station lines permanently associated with said circuit, means to trigger said circuit, means for counting a plurality of time intervals, means operative within a first plurality of time intervals counted, for enabling said circuit, means responsive to said enablement of said circuit for signalling all of said stations, said means including means for transmitting a tone signal to each busy one and a calling signal to each idle one of said lines, a slow operating relay in said circuit for each of said lines, means for preventing the operation of said relay upon the enablement of said circuit responsive to the busy condition of its associated line and means for operating said relay upon the enablement of said circuit responsive to the idle condition of its associated line, said slow operating relay controlling the transmission of said tone signal and said calling signal, and means operative at the termination of a second plurality of time intervals counted, for operating all of said relays whose operation had been previously prevented.

6. In a telecommunication system, a conference circuit, a predetermined plurality of station lines permanently associated with said circuit, a line switching relay in said circuit for each said line, said relay normally connecting said line to connections for normal use thereof and alternatively to said conference circuit, means to trigger said circuit, means for counting a plurality of time intervals, means operative within a first plurality of time intervals counted, for enabling said circuit, means responsive to said enablement of said circuit for signalling all of said stations, said means controlling the operation of each of said relays whose associated line is idle, means for preventing the operation of each of said relays whose associated line is busy, and means operative at the termination of a second plurality of time intervals counted, for operating all of said relays whose operation had been previously prevented.

References Cited in the file of this patent

UNITED STATES PATENTS

| | | |
|---|---|---|
| 2,386,126 | Lomax | Oct. 2, 1945 |
| 2,552,799 | Lomax | May 15, 1951 |

FOREIGN PATENTS

| | | |
|---|---|---|
| 336,946 | Great Britain | Oct. 21, 1930 |